Patented Nov. 13, 1945

2,388,937

UNITED STATES PATENT OFFICE 2,388,937

TREATMENT OF HYDROCARBON OILS

Louis Schmerling and Vladimir N. Ipatieff, Chicago, Ill., assignors to Universal Oil Products Company, Chicago, Ill., a corporation of Delaware No Drawing. Application September 9, 1940,
Serial No. 356,040

20 Claims. (Cl. 196—53)

This invention relates to the treatment of relatively heavy hydrocarbons or hydrocarbon mixtures, of which fractions of petroleum and primary distillates from the distillation of coal, wood, and shale are typical. It is more specifically concerned with processes for the so-called "destructive" hydrogenation of these oils to produce lower boiling products therefrom. The invention is particularly characterized by the use of novel types of catalysts for accomplishing these purposes.

Destructive hydrogenation, as distinguished from the simple addition of hydrogen to unsaturated bonds between carbon atoms, involves definite changes in structure, and may be designated as cracking under hydrogenating conditions so that the lower boiling products of the cracking reactions are substantially more saturated than when hydrogen or materials supplying hydrogen are not present. Destructive hydrogenation processes are most commonly employed on coals and heavy residual or distillate oils for the production of substantial yields of low boiling saturated products and to some extent of intermediates utilizable as domestic fuels and still heavier cuts suitable as lubricants. These destructive hydrogenation processes may be operated on a strictly thermal basis or in the presence of catalysts and in this respect an extremely large number of materials have been employed, for example, the metals of the iron group, including iron, nickel, or cobalt and the oxides and sulfides of chromium, molybdenum, and tungsten, representing the metals in the left-hand column of group VI of the periodic table. Numerous mixed metal and metal oxide catalysts have also been tried and less commonly metal salts.

Destructive hydrogenation operations are commonly conducted at relatively high hydrogen pressures, particularly those which are operated without the use of catalysts, pressures of 3000–5000 lbs./sq. in. being not uncommon, although with suitable catalysts, these pressures can be reduced. Temperatures are usually those within or slightly below the oil cracking range, say from 700–900° F. Hydrogen is preferably present in considerable molal excess and gas mixtures containing hydrogen and other gases such as methane, carbon monoxide, nitrogen, etc. may be employed. The present process embodies improved catalysts for use in destructive hydrogenation processes, which catalysts permit the attainment of the objects of such processes at relatively low temperatures and pressures.

In one specific embodiment, the present invention comprises a process for destructively hydrogenating hydrocarbonaceous materials which consists in subjecting such materials at elevated temperatures and pressure and in the presence of hydrogen to contact with granular catalysts comprising essentially composites of zinc chloride and aluminum oxide.

An extensive series of experiments which we have conducted with the above mentioned type of catalysts indicates that they are of outstanding value in promoting destructive hydrogenation reactions. These catalysts are made by simple methods of mixing in which some form of finely divided or formed alumina is mixed with either aqueous solutions of or dry zinc chloride although as a rule, the use of aqueous solutions is preferable. Bauxite may be used as a source of alumina, this mineral having the overall formula $Al_2O_3 \cdot 2H_2O$. Precipitated aluminum hydroxide may be employed or any of the forms of prepared alumina, commonly known as "activated" varieties and produced by controlled calcination of the hydrated forms. After mixing the materials in various proportions, they are dried at approximately 350° C. for a period of about 20 hours. When formed alumina is impregnated with zinc chloride solution, the particles are then ready for use in destructive hydrogenation and if powdered alumina is employed, the material resulting from the calcination which will be in the fused condition may be pulverized or granulated to produce particles of the desired size which can be used as such or formed by extrusion or pilling methods.

It is not certain whether the composition of these catalysts can be designated broadly by the formula $mZnCl_2 \cdot nAl_2O_3$ or whether zinc oxychlorides are present. When using different proportions of zinc chloride and alumina and different amounts of water, catalysts of varying composition are producible which have varying activities in reactions of destructive hydrogenation in which they may be employed. It has been found particularly beneficial in using the present types of catalysts in destructively hydrogenating hydrocarbons to have minor amounts of hydrogen chloride present, the effect of this addition being shown in later data in the section devoted to examples.

The present types of catalysts may be used at temperatures within the approximate range of 100–500° C. though as a rule the temperatures most commonly used fall within the limits of 350–450° C. Relatively high pressures of hydrogen are preferable of the order of 500–2000 lbs./sq. in. The process may be conducted on a batch or continuous basis although the latter method of operation is preferred commercially. In the batch process, the catalyst is mixed with the oil to be destructively hydrogenated in a pressure vessel preferably lined with material such as glass which has substantially no catalytic effect in the reactions as contrasted with metals, a small amount of hydrogen chloride is introduced, and hydrogen is admitted to develop the required pressure, found by trial to be optimum for the desired conversions. The pressure vessel is then exteriorly heated during mechanical stirring of the contents or rotation of the vessel to insure thorough mixing and contact with the reactants and the catalyst. In continuous processes granular catalyst is utilized in stationary beds in vertical or horizontal cylindrical chambers and the mixture of hydrocarbons to be hydrogenated, hydrogen chloride, and hydrogen are forced through the granular material after which the products are separated by fractionation and the unconverted and reusable constituents recycled.

The present process is applicable to the destructive hydrogenation of individual compounds such as naphthalene and anthracene to form mono-nuclear aromatics and to the destructive hydrogenation of relatively heavy residua and distillate fractions of petroleum to produce motor fuel fractions. The catalyst is also effective in such splitting reactions as the formation of iso-butane and benzene from sec-butylbenzene, and pentane and benzene from amylbenzene. This is in contrast with results obtained with more standard types of hydrogenating catalysts, such as nickel, which, for example, produces very little cleavage of the side chain of amyl benzenes and produces rather a mixture of alkyl cyclo-hexanes.

The following examples are introduced to indicate the type of results obtainable by using the present types of catalysts in destructive hydrogenation reactions, although it is not intended to limit the scope of the invention in precise correspondence with the data thus introduced.

*Example I*

A catalyst was prepared by impregnating 1/8" by 1/8" cylindrical activated alumina pills with an aqueous solution of zinc chloride followed by drying first at 100° C. and then at 350° C. The catalyst thus prepared contained basic zinc chloride (Zn(OH)Cl). The pressure vessel was charged with 90 parts by weight of naphthalene and 10 parts by weight of the above mentioned catalyst. Hydrogen was admitted to an initial pressure of 1500 lbs./sq. in. and the pressure vessel was heated at 400° C. for a period of 2 hours. Benzene, toluene, and xylenes were identified in the product which consisted of 22% of material boiling up to 175° C., 36% boiling up to 200° C., of 86% recovered liquid.

*Example II*

Using a catalyst prepared in substantially the same manner as in Example I, a charge of 10% by weight of catalyst and 90% by weight of a Pennsylvania gas oil was treated at 400° C. and an initial hydrogen pressure of 1500 lbs./sq. in. The average yield of 300 end-point gasoline in a series of 3 runs was 51.5% by weight of gas oil charged. The yield of 400 end-point material was 67.5%.

As a variation of the above runs, 2-4% by weight of hydrogen chloride was added to the pressure vessel which increased the yield of 300 end-point material from 51.5 to 55%. Furthermore the yield of condensible gas consisting of about 40 mol per cent propane, 54 mol per cent of iso-butane and 6 mol per cent of normal butane was increased from 8 to 26% by weight of the gas oil charged.

*Example III*

Using the same catalyst as in the preceding examples, the same proportions of oil and catalyst, and the same temperature and initial hydrogen pressure, a Trinidad gas oil was treated and yielded as an average of 3 runs 21% of 300° endpoint material.

*Example IV*

Amyl benzene was destructively hydrogenated in the presence of a zinc chloride on alumina catalyst, using a temperature of 400° C. 21% by weight of pentane was obtained and a 30% yield of benzene.

*Example V*

A similar run at 400° C. on sec-butylbenzene gave a 15% yield of iso-butane and a 31% yield of benzene by weight. These yields were increased by retreatment of unconverted material after separation of the reaction products. It is significant of the value of the process that the iso-butane was obtained from the decomposition of the butyl benzene rather than normal butane.

*Example VI*

To indicate the possibilities of the process in continuous operation, a Pennsylvania gas oil was destructively hydrogenated in the presence of a zinc chloride on alumina catalyst using an hourly liquid space velocity of one, a pressure of 1000 lbs. per square inch, and three moles of hydrogen per mol of gas oil. Separate runs of approximately 18 hours duration were made at temperatures of 400 and 450° C. The results in gasoline produced are given below:

| Temp., °C. | Per cent 300 E. P. gaso. | Per cent 400 E. P. gaso. | Octane No. 300° F. gaso. |
| --- | --- | --- | --- |
| 400 | 37.3 | 49.3 | 76.5 |
| 450 | 40.0 | 51.5 | 77.5 |

*Example VII*

Using a gas oil from a Trinidad crude, the following results were obtained in continuous operation:

| Temp., °C. | Per cent 300 E. P. gaso. | Per cent 400 E. P. gaso. | Octane No. 300° F. gaso. |
| --- | --- | --- | --- |
| 400 | 38.0 | 54 | 78.0 |
| 450 | 37.0 | 53 | |

We claim as our invention:

1. A process for the destructive hydrogenation of hydrocarbonaceous material which comprises reacting said material mixed with hydrogen in the presence of a zinc chloride and aluminum oxide.

2. A process for the destructive hydrogenation of hydrocarbonaceous material which comprises subjecting said material mixed with hydrogen to contact with a zinc chloride and aluminum oxide under catalytic destructive hydrogenation conditions of superatmospheric pressure and elevated temperature.

3. A process for the destructive hydrogenation of hydrocarbonaceous material which comprises subjecting said material mixed with hydrogen at a temperature of from about 100 to about 500° C. and under a pressure of from about 500 to about 2000 pounds per square inch to contact with catalytic material comprising essentially zinc chloride and aluminum oxide.

4. A process for the destructive hydrogenation of hydrocarbonaceous material which comprises subjecting said material mixed with hydrogen and a minor amount of hydrogen chloride at a temperature of from about 100 to about 500° C. under a pressure of from about 500 to about 2000 pounds per square inch to contact with catalytic material comprising essentially zinc chloride and aluminum oxide.

5. A process for the destructive hydrogenation of hydrocarbonaceous material which comprises subjecting said material mixed with hydrogen at a temperature of from about 100 to about 500° C. under a pressure of from about 500 to about 2000 pounds per square inch to contact with catalytic material comprising essentially zinc hydroxy chloride and aluminum oxide.

6. A process for the destructive hydrogenation of hydrocarbonaceous material which comprises subjecting said material mixed with hydrogen and a minor amount of hydrogen chloride at a temperature of from about 100 to about 500° C. under a pressure of from about 500 to about 2000 pounds per square inch to contact with catalytic material comprising essentially zinc hydroxy chloride and aluminum oxide.

7. A process for the destructive hydrogenation of poly-nuclear aromatic compounds to produce therefrom substantial yields of mono-nuclear aromatic compounds which comprises subjecting a poly-nuclear aromatic compound mixed with hydrogen to contact with catalytic material comprising essentially a zinc chloride and aluminum oxide.

8. A process for the destructive hydrogenation of poly-nuclear aromatic compounds to produce therefrom substantial yields of mono-nuclear aromatic compounds which comprises subjecting said poly-nuclear aromatic compound mixed with hydrogen at a temperature of from about 350 to about 450° C. and under a pressure of from about 1000 to about 2000 pounds per square inch to contact with catalytic material comprising essentially a zinc chloride and aluminum oxide.

9. A process for the destructive hydrogenation of poly-nuclear aromatic compounds to produce therefrom substantial yields of mono-nuclear aromatic compounds which comprises subjecting a poly-nuclear aromatic compound mixed with hydrogen and a minor amount of hydrogen chloride at a temperature of from about 350 to about 450° C. and under a pressure of from about 1000 to about 2000 pounds per square inch to contact with catalytic material comprising essentially zinc chloride and aluminum oxide.

10. A process for the destructive hydrogenation of poly-nuclear aromatic compounds to produce therefrom substantial yields of mono-nuclear aromatic compounds which comprises subjecting a poly-nuclear aromatic compound mixed with hydrogen at a temperature of from about 350 to about 450° C. and under a pressure of from about 1000 to about 2000 pounds per square inch to contact with catalytic material comprising essentially zinc hydroxy chloride and aluminum oxide.

11. A process for the destructive hydrogenation of poly-nuclear aromatic compounds to produce therefrom substantial yields of mono-nuclear aromatic compounds which comprises subjecting a poly-nuclear aromatic compound mixed with hydrogen and a minor amount of hydrogen chloride at a temperature of from about 350 to about 450° C. and under a pressure of from about 1000 to about 2000 pounds per square inch to contact with catalytic material comprising essentially zinc hydroxy chloride and aluminum oxide.

12. A process for the destructive hydrogenation of naphthalene to produce therefrom substantial yields of mono-nuclear aromatic compounds which comprises subjecting said naphthalene mixed with hydrogen at a temperature of from about 350 to about 450° C. and under a pressure of from about 1000 to about 2000 pounds per square inch to contact with catalytic material comprising essentially a zinc chloride and aluminum oxide.

13. A process for the destructive hydrogenation of naphthalene to produce therefrom substantial yields of mono-nuclear aromatic compounds which comprises subjecting said naphthalene mixed with hydrogen and a minor amount of hydrogen chloride at a temperature of from about 350 to about 450° C. and under a pressure of from about 1000 to about 2000 pounds per square inch to contact with catalytic material comprising essentially zinc chloride and aluminum oxide.

14. A process for the destructive hydrogenation of naphthalene to produce therefrom substantial yields of mono-nuclear aromatic compounds which comprises subjecting said naphthalene mixed with hydrogen and a minor amount of hydrogen chloride at a temperature of from about 350 to about 450° C. and under a pressure of from about 1000 to about 2000 pounds per square inch to contact with catalytic material comprising essentially zinc hydroxy chloride and aluminum oxide.

15. A process for the destructive hydrogenation of an alkyl benzene to produce therefrom substantial yields of paraffins and benzene which comprises subjecting said alkyl benzene mixed with hydrogen at a temperature of from about 350 to about 450° C. and under a pressure of from about 1000 to about 2000 pounds per square inch to contact with catalytic material comprising essentially a zinc chloride and aluminnum oxide.

16. A process for the destructive hydrogenation of an alkyl benzene to produce therefrom substantial yields of paraffins and benzene which comprises subjecting said alkyl benzene mixed with hydrogen and a minor amount of hydrogen chloride at a temperature of from about 350 to about 450° C. and under a pressure of from about 1000 to about 2000 pounds per square inch to contact with catalytic material comprising essentially zinc chloride and aluminum oxide.

17. A process for the destructive hydrogenation of an alkyl benzene to produce therefrom substantial yields of paraffins and benzene which comprises subjecting said alkyl benzene mixed with hydrogen and a minor amount of hydrogen chloride at a temperature of from about 350 to about 450° C. and under a pressure of from about 1000 to about 2000 pounds per square inch to contact with catalytic material comprising essentially zinc hydroxy chloride and aluminum oxide.

18. A process for the destructive hydrogenation of a relatively heavy petroleum fraction to produce substantial amounts of gasoline boiling range material therefrom which comprises subjecting said fraction mixed with hydrogen at a temperature of from about 100 to about 500° C. under a pressure of from about 500 to about 2000 pounds per square inch to contact with catalytic material comprising essentially a zinc chloride and aluminum oxide.

19. A process for the destructive hydrogenation of a relatively heavy petroleum fraction to produce substantial amounts of gasoline boiling range material therefrom which comprises subjecting said fraction mixed with hydrogen and a minor amount of hydrogen chloride at a temperature of from about 100 to about 500° C. under a pressure of from about 500 to about 2000 pounds per square inch to contact with catalytic material comprising essentially zinc chloride and aluminum oxide.

20. A process for the destructive hydrogenation of a relatively heavy petroleum fraction to produce substantial amounts of gasoline boiling range material therefrom which comprises subjecting said fraction mixed with hydrogen and a minor amount of hydrogen chloride at a temperature of from about 100 to about 500° C. and under a pressure of from about 500 to about 2000 pounds per square inch to contact with catalytic material comprising essentially zinc hydroxy chloride and aluminum oxide.

LOUIS SCHMERLING.
VLADIMIR N. IPATIEFF.